Patented Jan. 19, 1932

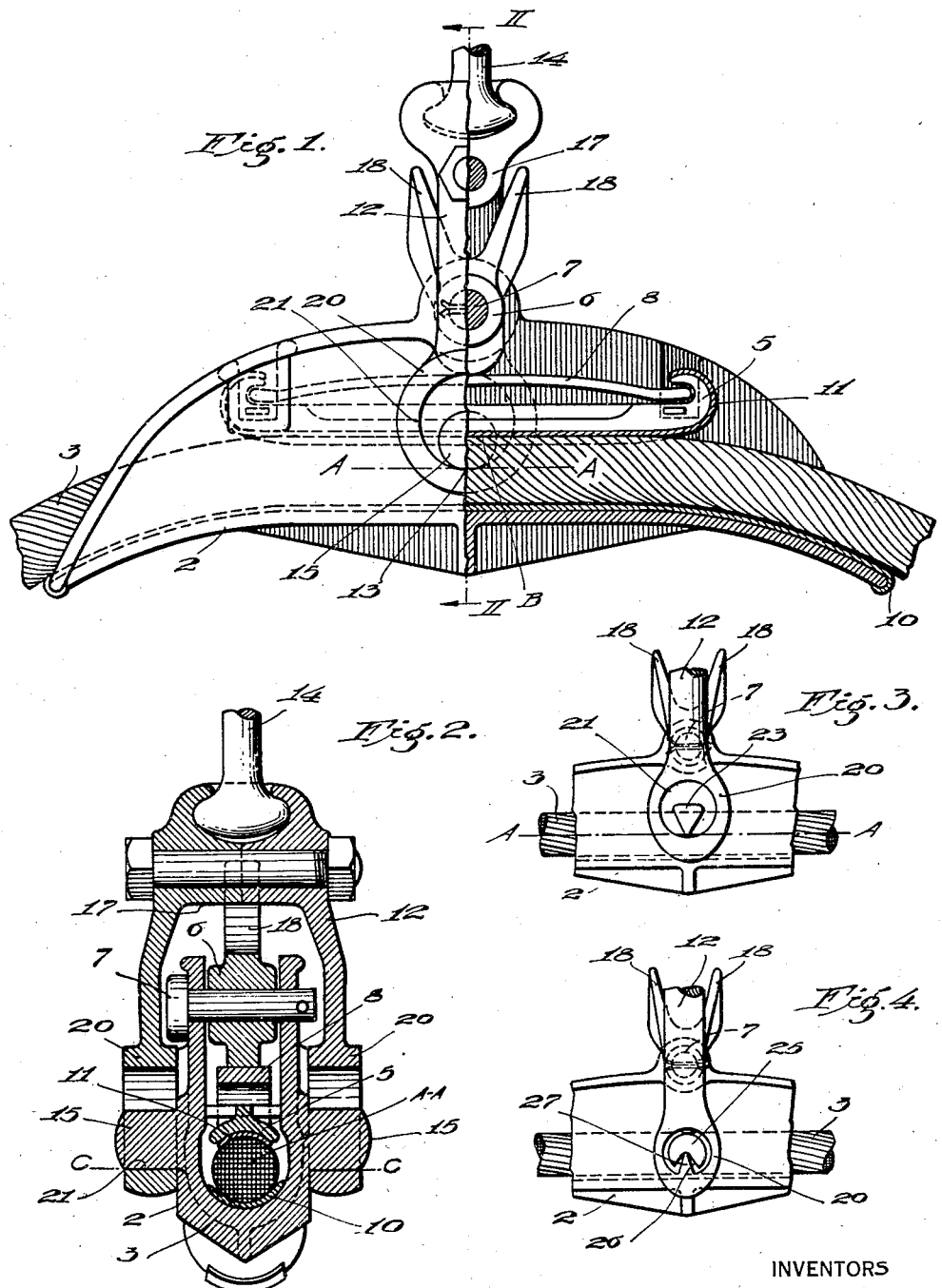

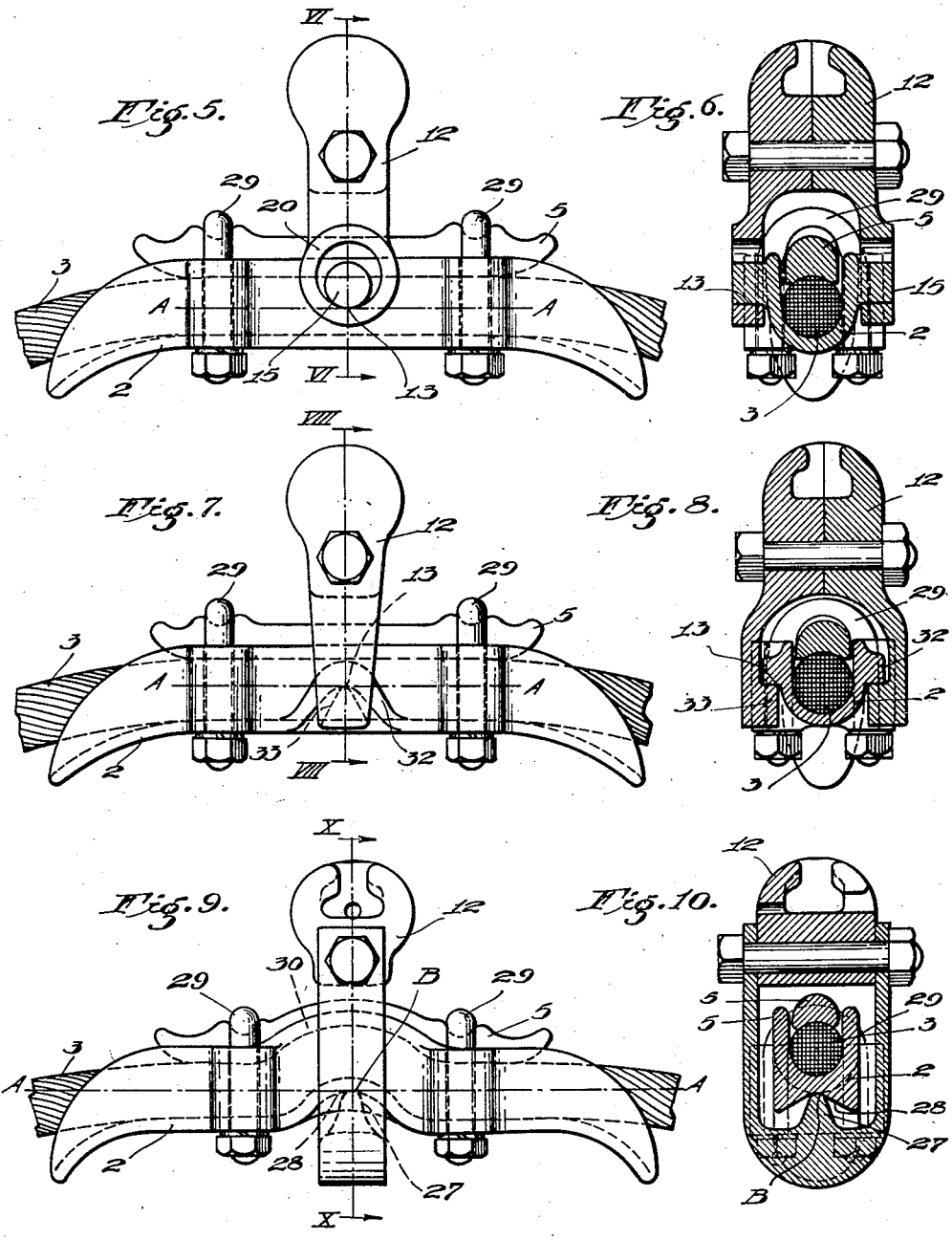

1,841,656

UNITED STATES PATENT OFFICE

WILLIAM W. WOODRUFF, OF SWARTHMORE, PENNSYLVANIA, AND RALPH L. JENNER, OF EAST ORANGE, NEW JERSEY

CABLE SUPPORT

Application filed February 8, 1930. Serial No. 426,833.

Our invention relates to cable supports and particularly to means for suspending high-voltage transmission-line conductors from main supports, such as wood poles and structural steel towers.

One object of our invention is to provide a device of the above-indicated character that shall relieve the support of excessive loading caused by breakage of the cable or excessive unbalanced load in successive spans.

Another object of our invention is to provide a cable support embodying relatively movable supporting and cable-receiving members between which there shall be rolling action instead of the usual partial rotative or turning action, thereby reducing friction and consequent resistance to motion, so as to minimize the stress in the cable necessary to cause such motion.

A further object of our invention is to provide a cable supporting device or clamp that shall be simple and durable in construction, economical to manufacture and effective in its operation.

It is well known that a conductor or cable, when in tightly-stretched suspension and subjected to wind currents, vibrates in a direction transverse to these currents, the periodicity of vibration being solely a function of the diameter of the cable and the velocity of the wind. This action is the Aeolian harp effect.

With a given periodicity, a series of standing waves are set up in the cable, the wave length and amplitude depending upon the tension in the cable and the moment of inertia.

When the cable is clamped and suspended from a support, the axis of oscillation of which is remote from the natural center of oscillation of the cable, stresses are set up in the cable caused by an enforced nodal point. This point is similar to a node caused by directly fixing the cable to a rigid support, because to have the support move in any way requires the expenditure of considerable energy.

This expenditure of energy gives rise to the stress in the cable which is one of the disadvantages of cable supports heretofore employed, and which our invention is intended to overcome by pivoting the support so that the nodal point formed is similar to a free node at the center of a span, at which point there is absolutely no change in stress.

In practicing our invention, we provide a structure which not only relieves the stresses on the support, caused by movement of the conductor, but also eliminates rubbing friction and lessens the resistance to motion, with a consequent reduction in bending of the cable, thereby lowering the stresses, in addition to precluding the necessity of having closely conforming bearings and possessing other advantages not known to us to have heretofore been employed or suggested.

Figure 1 of the accompanying drawings is a side view, partially in elevation and partially in section, of a cable support or clamp constructed in accordance with our invention;

Fig. 2 is a view taken substantially along the line II—II of Fig. 1,

Figs. 3 and 4 are fragmentary detail side views of modified forms of the invention, corresponding to a portion of the device shown adjacent to the center of Fig. 1, Figs. 5, 7 and 9 are side elevational views, similar to Fig. 1, of further modified forms of our invention, and Figs. 6, 8 and 10 are views, similar to Fig. 2, of the forms shown in Figs. 5, 7 and 9, respectively.

Referring to Figs. 1 and 2, the device here shown, which is preferably constructed entirely of metal, comprises, in general, a cable-receiving channel member 2 for the reception of a conductor or cable 3, a clamping shoe 5 for holding the cable 3 in the channel member 2, a cam 6 mounted on the channel member 2 by a bolt 7, for clamping action, through a spring 8, upon the shoe 5, yieldable linings 10 and 11, preferably of the same material as the cable 3, on the channel member 2 and the shoe 5, respectively, for preventing damage to the cable, and a supporting or suspension member or yoke 12 disposed between an insulator pin 14 and trunnions 15 on the channel member 2.

The clamp, in general, is similar in construction and operation to the clamp shown in our copending application, Serial No.

216,146, filed August 29, 1927, to which reference may be had.

While, so far as the present invention is concerned, the cable 3 may be permanently clamped in position, as by the usual J or U-bolts, as illustrated in Figs. 5 to 10, inclusive it is, in the forms of Figs. 1, 2, 3 and 4, clamped by the shoe 5, the spring 8 and the cam 6 in such manner as to be automatically released when the device, by breaking of the cable or other cause, swings a predetermined distance to the right or to the left, as viewed in Fig. 1 and as more fully set forth in our above-identified copending application.

In the normally suspended position of parts shown in Fig. 1, the cam 6 depresses the spring 8 to force the shoe 5 against the cable. When the device swings a predetermined distance, the yoke 12 moves about the trunnions 15, whereby a portion 17 of the yoke engages one or the other of fingers 18 on the cam 6 to release the spring. Under normal oscillation or swing, the fingers 18 are sufficiently spaced from the portion 17 to preclude frictional movement between any of the parts.

Our present invention relates particularly to the construction and relation of the trunnions 15 to the free-end bearing portions 20 and to the channel member 2 and the cable 3.

Referring to Fig. 1, a broken line A—A represents a portion of the longitudinal central axis of the cable in its position in the clamp.

In the device of our copending application, the trunnions, corresponding to the trunnions 15 herein, have the alined longitudinal central axes thereof directed through the axis of the cable corresponding to the axis A—A. This feature is provided to reduce the lever-arm effect between the channel member 2 and the yoke 12 when the cable oscillates; but, in such structure, the trunnions, to be most effective when thus disposed and constructed, must be of accurate fit in openings in the legs of the yoke and friction must be minimized.

By our present invention, instead of having the axes of the trunnions 15 directed through the axis A—A of the cable 3, the points B of engagement between the trunnions 15 and the bearing portions 20 are on a line C—C, see Fig. 2, through the axis A—A. In other words, the points B are in a plane substantially at right angles to the vertical load axis or axis of support in the yoke 12 in which plane also lies the longitudinal axis A—A of the cable 3.

By this construction and with the inner bearing surfaces 21, of the bearing portion 20, having appreciably greater curvature or radius than the radius of the trunnions 15, the latter, instead of rubbing on the surfaces 15, have rolling engagement therewith. By this construction also the axis of movement between the channel member and the yoke is placed closer, by a distance equal to the radius of the trunnions in the device of the copending application, to the actual dead center between the yoke and the channel member, thereby reducing the stress in the cable and rendering the node point at the support similar to a free node at the center of the cable span.

In Fig. 3, the trunnions 15 of the structure of Figs. 1 and 2 are replaced by fulcrum members 23 which may have knife-edge or slightly rounded substantially knife-edge relation to the bearing portions 20.

In Fig. 4, members 25 correspond to the trunnions 15 of Figs. 1 and 2 and have underside recesses 26 in which portions 27, on the bearing portions 20, are disposed for rolling movement.

In Figs. 5 and 6, the structure of our invention is substantially the same as shown in Figs. 1 and 2, except that the shoe 5 is clamped by U-bolts 29 instead of by the cam 6 and the spring 8.

In Figs. 7 and 8, the structure is similar to that of Fig. 4, except that, instead of the elements 23 of trunnion-shape, there are provided webs 32 of substantially hood-shape constituting integral parts of the channel member 2 for the reception of fulcrum portions 33 on the yoke 12.

In Figs. 9 and 10, in which the shoe 5 is secured to the channel member 2 by bolts 29, an upwardly projecting portion 27, on the bearing portion 20 of the yoke 12, engages a central underside recessed portion 28 of the channel member 2 so that the yoke and channel members have substantially universal relative movement about the point B instead of the ordinary hinge movement as in the devices of the other figures.

Since, in the structure of Fig. 9, the cable 3 must have a bend 30 to by-pass it about the points B, the axis A—A may be called the general longitudinal axis of the cable for simplicity of description and identification in the claims, as representing structure similar to that in the other figures.

In other words, the axis A—A is the ordinary or general position of the cable axis, as in the other figures, but, to obtain the universal movement about a point B in a plane at right angles to the normal load axis of the device, or vertical central axis of the yoke, which plane is also the plane in which the axis A—A lies, the cable must be bent. In this figure, the axis A—A is actually the axis along which the cable enters and leaves the channel member and is called the general axis of the cable to permit it to be claimed generically with the other structures.

All of the structures represented by Figures 3 to 10, inclusive, operate similarly to the structure of Figs. 1 and 2 to provide rolling, instead of rubbing, engagement between the yokes and the channel members, to place the axes of movement between the channel members and the yokes closer, by distances equal to the radius of the trunnions in the device of the copending application, to the actual dead centers between the yokes and the channel members, thereby reducing the stresses in the cables and rendering the node points at the supports similar to a free node at the center of the cable span.

By our invention, a simple, rugged and effective cable support or clamp is provided which, by avoiding accurately fitted trunnions and trunnion bearings and for other reasons, is economical to manufacture, avoids wear on the parts, more effectively eliminates damage caused by vibratory forces and is an improvement, in general, over similar structures heretofore employed.

While we have shown several forms of our invention, the parts may be further modified, redistributed and recombined in various ways without departing from the spirit and scope of the invention, as set forth in the appended claims.

We claim as our invention:

1. In a cable support, a cable-supporting member, and a member for relatively movably supporting said cable-supporting member, one of said members having substantially trunnion elements at opposite sides of said cable-supporting member and the other member having loop-like cooperating bearing portions of substantially greater interior diameter than the outer diameters of the trunnions and disposed about the trunnions.

2. In a cable support, cooperating cable-clamping members for extension along the cable, one of said members including transversely alined trunnion-like elements at opposite sides thereof having bearing-surface portions of reduced radius, and a suspension yoke embracing said members and having apertured bearing leg portions of substantially greater interior diameters than said elements surrounding the same.

3. In a cable support, a cable-receiving member, and a relatively movable supporting member therefor, a bearing surface of one of said members being rounded and a cooperating bearing surface of the other member being tangent to, and diverging substantially in opposite directions from, said rounded surface.

4. In a cable support, a cable-receiving member, and a relatively movable supporting member for said receiving member, said members having engaging bearing surfaces lying substantially in a plane of a position of the cable axis in the receiving member, one of said surfaces being rounded and the other being tangent to, and diverging substantially in opposite directions from, said rounded surface.

5. In a cable support, a cable-supporting member and a member relatively movably supporting said member, one of said members having a shaft-like bearing portion and the other member having a loop-like cooperating bearing portion of substantially greater interior diameter than the outer diameter of, and surrounding, said shaft-like bearing portion, said loop bearing portion having a bearing surface tangent to, and diverging substantially in opposite directions from the cooperating bearing surface of the shaft.

In testimony whereof, we have hereunto subscribed our names.

WILLIAM W. WOODRUFF.
RALPH L. JENNER.